Feb. 12, 1952     H. F. SNOW     2,585,695
ADJUSTABLE LOADING RAMP AND THE LIKE
Filed Feb. 25, 1949
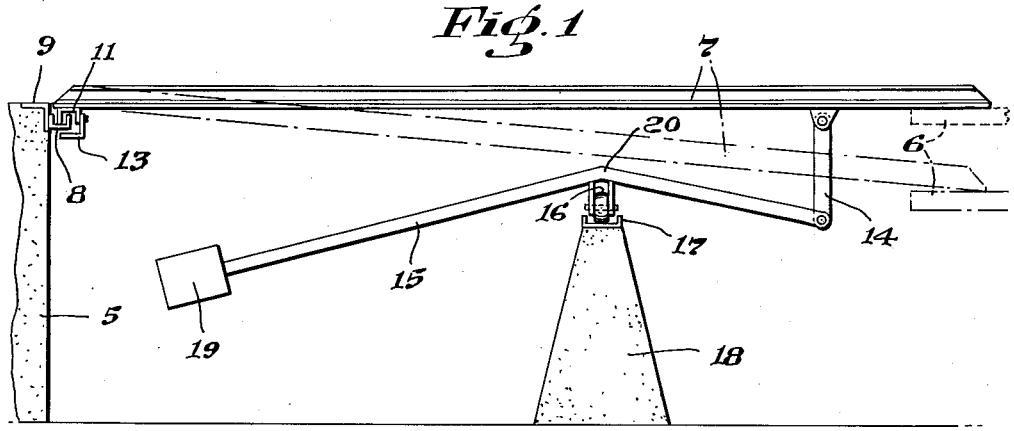
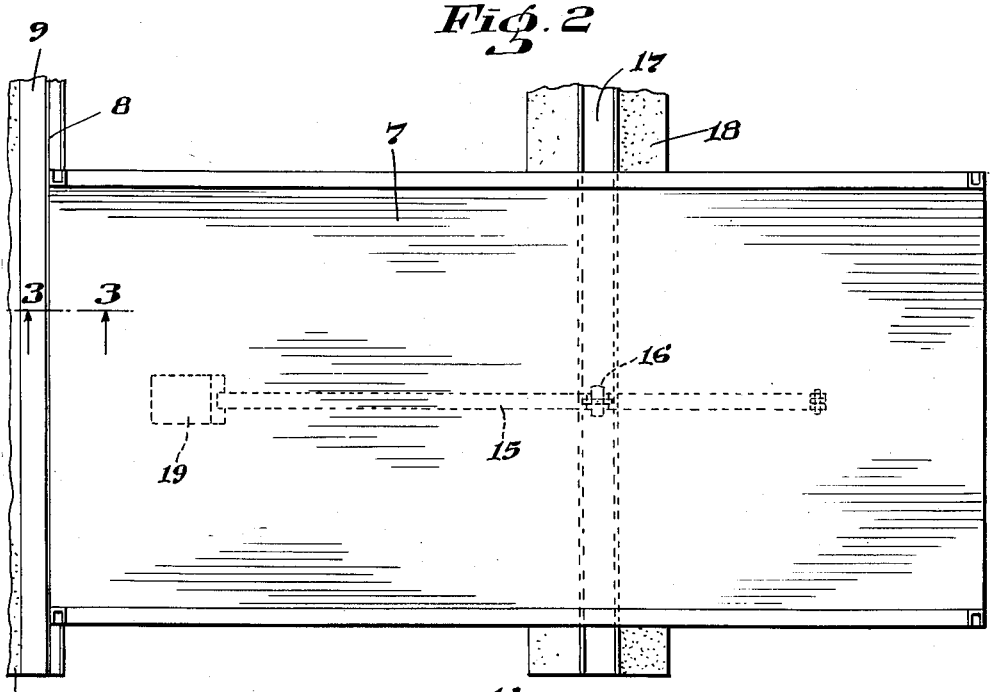
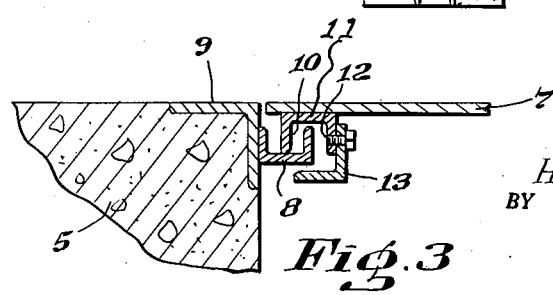
INVENTOR.
HAROLD F. SNOW
BY
*Abbott Spear*
ATTORNEY Patented Feb. 12, 1952

2,585,695

UNITED STATES PATENT OFFICE 2,585,695

ADJUSTABLE LOADING RAMP AND THE LIKE

Harold F. Snow, Pine Point, Maine

Application February 25, 1949, Serial No. 78,450

5 Claims. (Cl. 14—71)

My present invention relates to equipment for use in transferring loads between a vehicle and a warehouse dock or the like.

Such transfer of loads is rendered difficult by reason of variations in the height of truck bodies. When the load receiving or shipping surface is established by a platform, the difficulty is readily eliminated, in accordance with my now abandoned co-pending application, Serial No. 711,920, filed November 23, 1946, because space under the surface is available to receive the counterweighted arm by which the slidably supported ramp is yieldably maintained in an upwardly tilted position.

Warehouse docks are commonly of poured masonry, for example, with the result that no such space is available and it is the primary objective of this invention to provide load transferring equipment in which the counterweighted ramp tilting means does not require that it be received under the load receiving or shipping surface.

In accordance with my present invention, I provide a supporting member which establishes a pathway of desired length along the edge of the load receiving and shipping surface and connect the rear edge of the ramp thereto by means enabling it to be moved along the pathway and tilted upwardly or downwardly in any position along it. Adjacent the front end of the ramp, I pivotally attach a depending arm, to the free end of which I pivotally attach the front end of a rearwardly disposed and counterweighted lever. I provide a support on the ground intermediate the ends of the ramp of sufficient length to establish a second pathway in parallel with the first pathway between which and the lever is a suitable connection to enable the lever to move with the ramp and to enable the support to serve as a fulcrum for the lever as the ramp is tilted in either direction.

In the drawings, I have shown an illustrative embodiment of my invention from which its several novel features and advantages will be apparent.

In the drawings:

Fig. 1 is a side view of an installed ramp in accordance with my invention.

Fig. 2 is a top plan view of the installation of Fig. 1, and

Fig. 3 is a fragmentary section, on an enlarged scale, along the lines 3—3 of Fig. 1.

At 5, I have indicated a warehouse dock of poured masonry as an example of a load receiving or shipping surface having no available open space thereunder as required by an installation in accordance with my co-pending application, Serial No. 711,920, filed November 23, 1946 and since abandoned.

In order that loads may be transferred, with maximum ease and convenience, between the dock 5 and a vehicle body 6 regardless of its height, I provide the front upper edge of the dock 5 with means to support the ramp 7 so that it may be slid along the edge of the dock 5 and tilted upwardly and downwardly in any of its positions along that edge. While such means may be of any type, I have shown them as consisting of a channel member 8 anchored as at 9 to the dock 5 adjacent its upper edge and disposed to receive the flange 10 of the oppositely disposed channel member 11 which is suitably secured to the under surface of the ramp 7 adjacent its rear edge. To the other edge 12 of the channel member 11, I attach a keeper 13 of L-shaped section which underlies the channel 8 as may be most clearly seen in Fig. 3.

As illustrative of counterweighted means slidably supporting the ramp 7 and yieldably holding it in an upwardly tilted position, I have shown the ramp 7 as having an arm 14 pivotally attached thereto adjacent its front end and intermediate its sides. One end of a lever 15 is pivotally connected to the lower end of the arm 14 and I have shown the lever 15 as having a caster 16 in engagement with the pathway established by the channel member 17. The channel member 17 is disposed in parallel with the pathway established by the channel member 8 and is mounted on a support 18. More than one caster 16 may be employed, if desired, in connecting the lever 15 to the channel member 17 to move freely therealong as the ramp 7 is shifted along the front edge of the dock 5. The thus connected lever 15 is properly fulcrumed at all times and is counterweighted at 19 so that it yieldably holds the ramp 7 in such an upwardly tilted position that as a truck is backed towards the dock 5, the rear part of its body 6 may extend freely thereunder.

This construction enables the ramp 7 to be readily tilted downwardly into contact with the body 6 and held in that place by relatively light weights while loads are being transferred. In order to ensure that the ramp 7 may be readily tilted and easily removed, the channel member 17 is substantially wider than the caster 16 and the caster 16 preferably has a transversely rounded periphery.

In accordance with my invention, I am thus able to equip load receiving and shipping surfaces of solid construction with one or more slidable and tiltable ramps 7 to enable loads to be transferred with maximum ease and convenience to and from vehicles regardless of the height of their bodies in relation to that of the load receiving and shipping surface.

What I therefore claim and desire to secure by Letters Patent is:

1. Load transferring equipment comprising a ramp, supporting means for said ramp, a connection between said ramp and said means, said connection including a trackway carried by said means and a member carried by said ramp adjacent its rear edge movably engaging said trackway to enable said ramp to be moved along said trackway and to be swung upwardly and downwardly in any of its positions therealong, a depending arm pivotally connected to said ramp adjacent its front end, a rearwardly extending counterweighted lever pivotally connected at its front end to the free end of said arm, supporting means for said lever in parallel with said first trackway and located intermediate the ends of said ramp, and a connection between said lever and said second supporting means including a second trackway carried by said second means and a member carried by said lever movably engaging said second named trackway to enable said lever to be moved relative to said second supporting means as said ramp is moved along said first trackway and to establish a fulcrum for said lever as said ramp is raised and lowered, each of said trackways being wider than the member engaging therewith.

2. The equipment of claim 1 in which said first trackway is a channel, the member engageable therewith is one flange of a second inverted channel, the other flange of said second member being spaced from said first channel, and a keeper member carried by said other flange to extend under the first channel in spaced relation thereto.

3. The equipment of claim 1 in which the second trackway of one of the connections is a channel, and the member engageable therewith is a rotatable member.

4. Load transferring equipment comprising a ramp, supporting means for said ramp, a connection between said ramp and said means, said connection including a trackway carried by said means and a member carried by said ramp adjacent its rear edge movably engaging said trackway to enable said ramp to be moved along said trackway, said trackway being wider than said member to enable said ramp also to be swung upwardly and downwardly in any of its positions therealong, a depending arm pivotally connected to said ramp adjacent its front end, a rearwardly extending counterweighted lever pivotally connected at its front end to the free end of said arm, supporting means for said lever in parallel with said first trackway and located intermediate the ends of said ramp, and a connection between said lever and said second supporting means including a second trackway carried by said second means and a caster carried by said lever engaging said second named trackway to enable said lever to be moved relative to said second supporting means as said ramp is moved along said first trackway and to establish a fulcrum for said lever as said ramp is raised and lowered, said second named trackway being substantially wider than said caster and the periphery of said caster being transversely rounded.

5. The load transferring equipment of claim 4 in which the first trackway is in the form of a channel of a substantially greater width than the trackway engaging member.

HAROLD F. SNOW.

REFERENCES CITED

The following references are of record in the file of this patent:

UNITED STATES PATENTS

| Number | Name | Date |
| --- | --- | --- |
| 476,601 | Boeselager | June 7, 1892 |
| 639,051 | Hutchinson | Dec. 12, 1899 |
| 1,140,833 | Keuling | May 25, 1915 |
| 2,473,127 | Alexander | June 14, 1949 |